April 15, 1952 — H. J. NOLL — 2,592,722
ADJUSTABLE WIDTH GATE
Filed March 24, 1950 — 2 SHEETS—SHEET 1
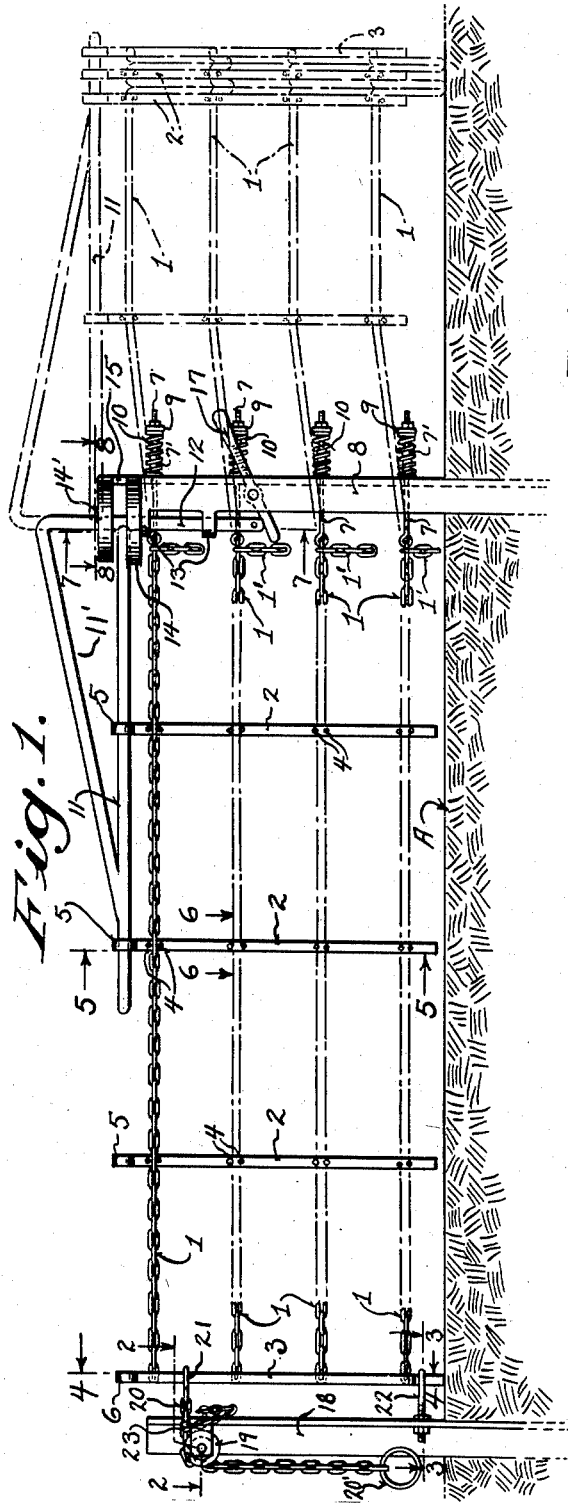
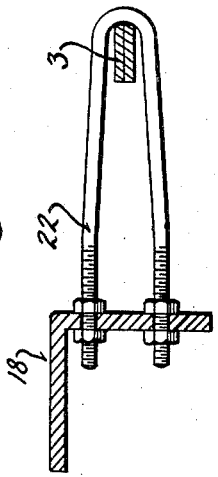
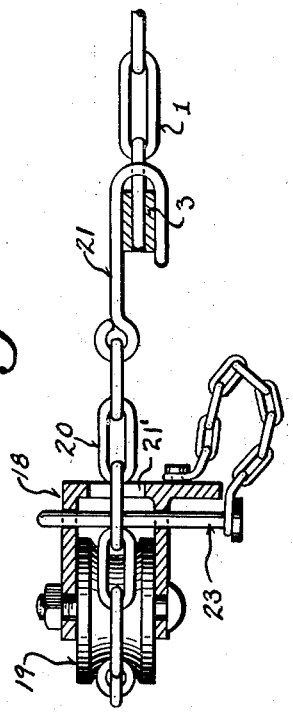
INVENTOR
HENRY J. NOLL
BY
ATTORNEYS

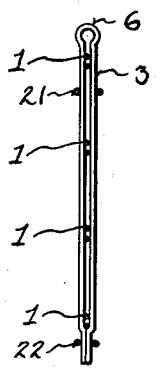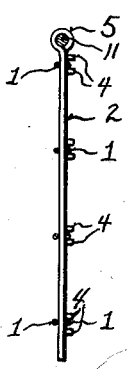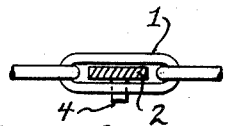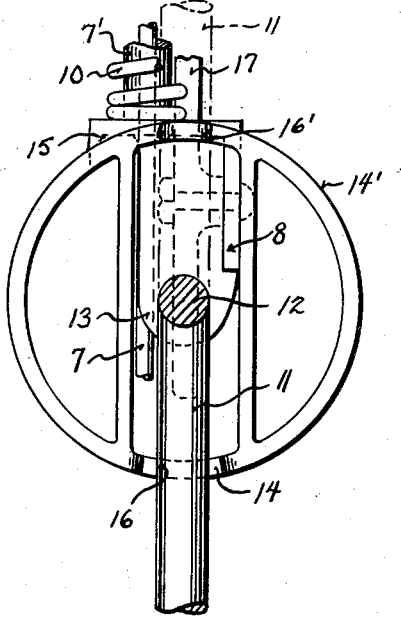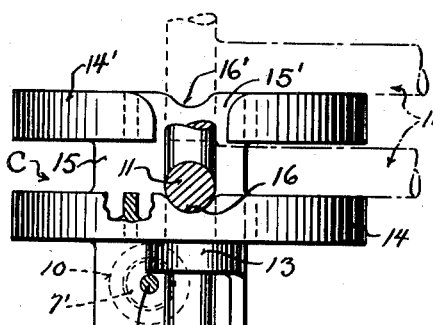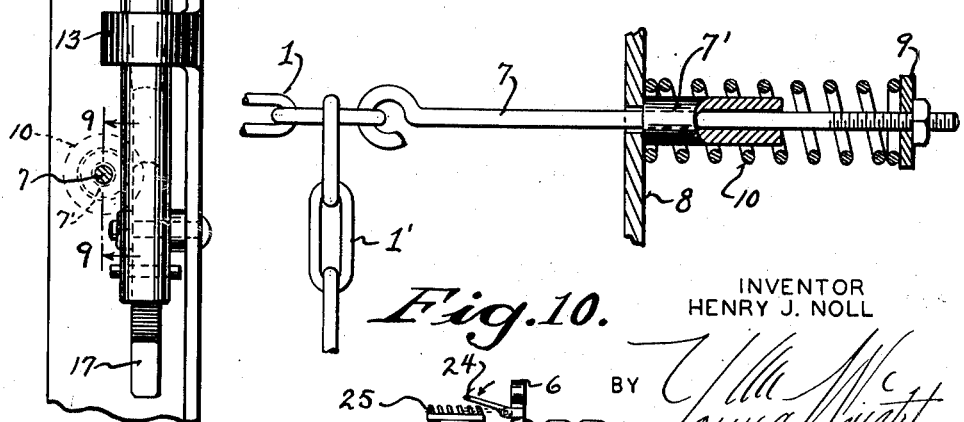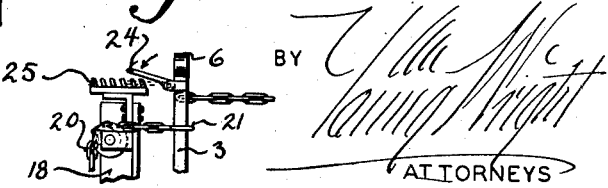

Patented Apr. 15, 1952

2,592,722

UNITED STATES PATENT OFFICE 2,592,722

ADJUSTABLE WIDTH GATE

Henry J. Noll, Milwaukee, Wis.

Application March 24, 1950, Serial No. 151,692

4 Claims. (Cl. 39—74)

My invention refers to flexible farm gates adapted to partially open for standard vehicles and to fully open for wide gage farm implements.

The object of my invention is to provide a series of horizontally positioned flexible rails, having spaced vertically disposed standards connected thereto, the flexible rails, at their hinge ends, being yieldably connected to a hinge-post. Intermediate gate standards are suspended from a load supporting brace-bar, which brace-bar is provided with a downturned swivel pintle, journaled in ears, extending from the hinge-post.

The load strain of the gate is supported by a circular bracket secured to the upper end of the hinge-post having flanges therein for setting the gate in its open or closed position, whereby approximately one-half of the gate may be folded open for the passage of standard vehicles, while the entire gate is swung open for wide gage farm machinery.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 represents a side elevation of a farm gate embodying the features of my invention.

Figure 2 is an enlarged plan sectional view through the swinging end of the gate and a fence post illustrating one means for locking the gate in its closed position, the section being indicated by line 2, 2 of Figure 1.

Figure 3 is an enlarged cross sectional detailed view through the fence post and gate anchor means thereto, the section being indicated by line 3, 3 of Figure 1.

Figure 4 is an end view of the gate illustrating its finishing standard, the same being in section as indicated by line 4, 4 of Figure 1.

Figure 5 is a similar sectional end view through the gate, the section being indicated by line 5, 5 of Figure 1.

Figure 6 is a detailed cross section through an intermediate gate standard, the section being indicated by line 6, 6 of Figure 1.

Figure 7 is an enlarged detailed sectional elevation through the pivoted end of the gate and associated circular brackets, the section being indicated by line 7, 7 of Figure 1.

Figure 8 is a plan sectional view through the swivel pintle and associated supporting circular bracket, the section being indicated by line 8, 8 of Figure 1.

Figure 9 is a detailed sectional elevation between the ground post yielding connection between said post and flexible rail, the section being indicated by line 9, 9 of Figure 4; and Figure 10 is a fragmentary side elevation of a modified form for locking the gate and fence post together when said gate is closed.

Referring by characters to the drawings, 1 indicates a series of flexible rails preferably in the form of standard chains.

The chain rails are connected by a series of vertically disposed standards 2 and an outer finishing standard 3, as best shown in Figure 1 of the drawings.

The vertically disposed standards 2 pass through links of the flexible rails, as best shown in Figure 6 of the drawings, and the chain links through which the standard projections are held against vertical movement by a pair of pins 4, the upper end of said standards terminating with loops 5.

The finishing standard 3 of the gate, as best shown in Figures 1 and 4 of the drawings, are fabricated from a metallic strap folded upon itself and spaced apart to receive the last links of the chain rails 1, which last links are spot welded between the faces of the folded standard 3. The upper folded end of the standard 3 is formed with a loop 6 and the lower ends of said standard is brought together and spot welded, as shown in Figure 4 of the drawings.

The rear swinging ends of the chain rails 1 are connected to rods 7 and said rods pass through apertures formed in the anchor hinge post 8, which post is of the standard angle iron type.

As best indicated in Figure 9 of the drawings, each end rod 7 has mounted thereon a sleeve 7'. Each end rod 7 carries an adjustable washer 9 and a set nut. I also provide a coil spring 10, about the rod, the compression of which spring is limited by engagement of the washer with the sleeve 7'.

The load strain upon the flexible gate is partly supported by a brace-bar 11 positioned above the top flexible rail, and said brace-bar engages two of the loops 5 at the ends of the standards 2. The brace-bar is provided on one end with a vertically disposed swivel pintle 12, which pintle extends slightly above the brace-bar 11 and is then inclined downwardly at 11' toward the other end of the brace-bar 11 and fixed thereto for strengthening purposes. The pintle 12 is pivotally mounted in a pair of ears 13, which extend from the angle iron hinge-post 8.

Secured to the upper end of the hinge post 8 is a circular bracket C, having spaced ring flanges 14, 14', which flanges are of skeleton type and terminate with a depending pad 15 that is suitably secured to the hinge post end.

It should be noted that the brace-bar is adapted to swing radially between the circular bracket flanges, and when the gate is closed, the brace-bar is pocketed in a recess 16 formed in the lower flange. The similar upper flange 14' is formed at its front edge with an open throat 15', and its rear edge with a recess 16', whereby the brace rod is lifted from the bottom flange.

The pair of circular flanges 14, 14' of the bracket are particularly provided for the purpose of vertical adjustment of the gate to accommodate the same to smooth or rough ground conditions.

For example, should the ground line A be comparatively smooth, it would not be necessary to lift the gate in a swinging operation, except to disconnect the brace-bar from the bracket recess 16. This lift of the pintle 12 is accomplished through a manually controlled lever 17 that is pivoted to the hinge-post, having one end in alignment with the lower end of said swivel pintle, for engaging the same.

However, should the ground be more or less rough, the brace rod would be lifted by the lever 17, slightly above the plane of the flange 14, whereby upon swinging of the gate, the brace-bar will ride upon the upper edge of the circular flange 14' as shown, and should the gate be swung full open, making a half turn, the brace-bar would center itself into the recess 16' of the bracket, as best indicated in Figure 7 of the drawings.

As shown in Figures 1 and 9 of the drawings, the spring controlled rods 7 are connected to the link stretches 1, which link stretches terminate with slack ends 1', for the purpose of slight variation of the adjustment of the width of the gate between the latch-post 18 and hinge-post 8.

The latch-post 18, as best shown in Figures 1 and 2 of the drawings, has mounted therein a pulley 19 over which is trained a latch chain 20, which chain passes through an aperture 21' in the post. The inner end of the chain is provided with a hook 21, which engages the standard 3, and the lower end of said chain terminates with a foot link or stirrup 20'.

Secured to the bottom portion of the latch-post is a loop 22 provided for the reception of the bottom end of the gate standard 3, whereby said end is anchored when the gate is closed.

From the foregoing description, to close the gate and take up the slack in the chain rails, the bottom of the standard 3 is inserted in the loop 22, whereby a leverage is formed for the standard and thereafter, the hook 21 of the slack latch chain 20 is hooked about the upper end of the standard 3. The operator will then insert a foot into the link or stirrup 20', whereby said standard is drawn forward in a vertical position, as shown in Figure 1 of the drawings, whereby all slack is taken up in the gate. Thereafter, a locking pin 23, flexibly connected to the post, is inserted through one of the chain links and apertures in the post, whereby latching of the gate is completed.

As illustrated in Figure 10 of the drawings, I show a modified form of latch for the gate. This form simply comprises a link 24 that is pivoted to the end of the standard 3, and said link is adapted to engage any one of the series of pins 25 that are carried by a bracket projecting from the end of the latch post 18.

From the foregoing description, when it is desired to open the gate for a standard vehicle to pass therethrough, the gate standard 3 is first unlatched and released from the latch post 18. Thereafter, the loop 5 of the gate standard 2 is slidably fitted over the end of the brace-bar together with the loop 6 of the standard 3, whereby this portion of the gate is folded compactly against the second standard 2, and the chain stretchers will, of course, obviously slacken, whereby a clearance opening is effected through which the vehicle may pass.

Should it be desired to fully open the gate for the passage of a wide gage piece of machinery, after the front end standards of said gate have been looped over the brace-bar, it would only be necessary to lift the gate standards by actuating the lever 17, whereby the swivel pintle of said brace-bar will be swung upon its pivot connections, as indicated in dotted lines, Figure 1, or in some instances, the gate may simply be swung a quarter of circle for opening, should it be desired.

Stress is laid on the manner of connecting the gate standards 2 with the chains 1, and it is to be noted that the connection is such that the chains have limited movement relative to one another and to these standards 2. This effectively takes care of any variance in the chains.

I claim:

1. A flexible farm gate comprising a series of horizontally disposed flexible rails, vertically disposed standards connected to the flexible rails, a hinge-post positioned at the pivot end of the gate, spring controlled rods slidably engaging the hinge-post and connected to the ends of the flexible rails, a load supporting brace-bar having a depending swivel pintle in pivotal connection with the hinge post, a latch-post at the swinging end of said gate to the post, a circular flanged bracket secured to the end of the hinge-post engaging the brace-bar, and a lever means pivoted to the post for engaging the swivel pintle for raising the brace-bar, and rotating the same upon the circular flanged bracket.

2. A flexible farm gate comprising a series of normally spaced vertical standards, a plurality of flexible rails connecting said standards together, a hinge-post, means connecting the inner ends of the flexible rails to the post for swinging movement, a bracket secured to the upper end of the hinge-post including central bearing and spaced circular flanges, said flanges defining a track therebetween, a radially extending load supporting brace-bar extending partly over the gate having a depending vertical pinion rotatably mounted in the bracket and a gate supporting arm normally positioned between the guide flanges for turning movement, means securing certain of the standards to the arm, and depressions in said flanges for receiving said arm in different positions of the gate for holding the gate and load supporting brace-bar in selected positions.

3. A flexible farm gate comprising a series of normally spaced vertical standards, a plurality of flexible rails connecting said standards together, a hinge-post, means connecting the inner ends of the flexible rails to the post for swinging movement, a bracket secured to the upper end of the hinge-post including central bearing and spaced circular flanges, said flanges defining a track therebetween, a radially extending load supporting brace-bar extending partly over the gate having a depending vertical pintle rotatably mounted in the bracket and a gate supporting arm normally positioned between the guide flanges for turning movement, means securing certain of the standards to the arm, and depressions in said flanges for receiving said arm in different positions of the gate for holding the gate and load supporting brace-bar in selected positions, the uppermost of said flanges having a slot so that said arm can be raised through said slot on the uppermost of said flanges.

4. A flexible farm gate comprising a series of normally spaced vertical standards, a plurality of horizontally disposed flexible rails connecting said standards together, a hinge-post, means hingedly connecting the inner ends of the flexible rails to the hinge-post, means securing the outer ends of the flexible rails to one of said vertical standards, the upper ends of said vertical standards terminating in eye loops, and a load supporting brace-bar rotatably mounted on said hinge-post and having a horizontally disposed portion permanently receiving the eye loops of certain of the vertical standards on the inner end of the gate when the gate is in the closed position, the outer end of said gate being movable toward the brace-bar, whereby the eye loops of the outer vertical standards can be detachably fitted over the horizontally disposed portion of said bar to partially open the gate.

HENRY J. NOLL.

REFERENCES CITED

The following references are of record in the file of this patent:

UNITED STATES PATENTS

| Number | Name | Date |
| --- | --- | --- |
| 274,173 | Chapman | Mar. 20, 1883 |
| 562,328 | Wolcott et al. | June 16, 1896 |
| 625,768 | Hobart | May 30, 1899 |
| 648,313 | Thoma | Apr. 24, 1900 |
| 754,876 | Laney | Mar. 15, 1904 |
| 919,705 | Edwards | Apr. 27, 1909 |
| 1,027,237 | Campbell | May 21, 1912 |
| 1,619,819 | Hageman | Mar. 8, 1927 |